C. A. KIRBY.
WAGON BRAKE.
APPLICATION FILED FEB. 17, 1914.

1,163,546.

Patented Dec. 7, 1915.

Witnesses
W. S. McDowell
K. Peacock

Inventor
C. A. Kirby,
By Victor J. Evans
Attorney

UNITED STATES PATENT OFFICE.

CHARLES A. KIRBY, OF LA FARGEVILLE, NEW YORK.

WAGON-BRAKE.

1,163,546.  Specification of Letters Patent.  Patented Dec. 7, 1915.

Application filed February 17, 1914. Serial No. 819,271.

*To all whom it may concern:*

Be it known that I, CHARLES A. KIRBY, a citizen of the United States, residing at La Fargeville, in the county of Jefferson and State of New York, have invented new and useful Improvements in Wagon-Brakes, of which the following is a specification.

This invention has relation to wagon brakes and it consists in the novel features hereinafter described and claimed.

An object of the invention is to provide a brake mechanism of simple structure especially adapted to be applied to the running gear of a farm wagon and having a brake beam provided with shoes adapted to encounter the peripheries of the front wheels of the running gear.

A further object of the invention is to provide in connection with a brake mechanism as above indicated, means for operating the same from the tongue of the running gear. That is to say, when the tongue is pulled in a forward direction, the brake beam and shoes are moved away from the forward wheels but when a backing strain is applied to the tongue, the beam is moved in a forward direction whereby the shoes are automatically applied to the wheels.

A further object of the invention is to provide in conjunction with a brake mechanism as above indicated, means for locking the parts against relative movement whereby the running gear may be moved in a forward or backward direction by strains or pulls applied to the tongue without operating the brake mechanism.

Figure 1:
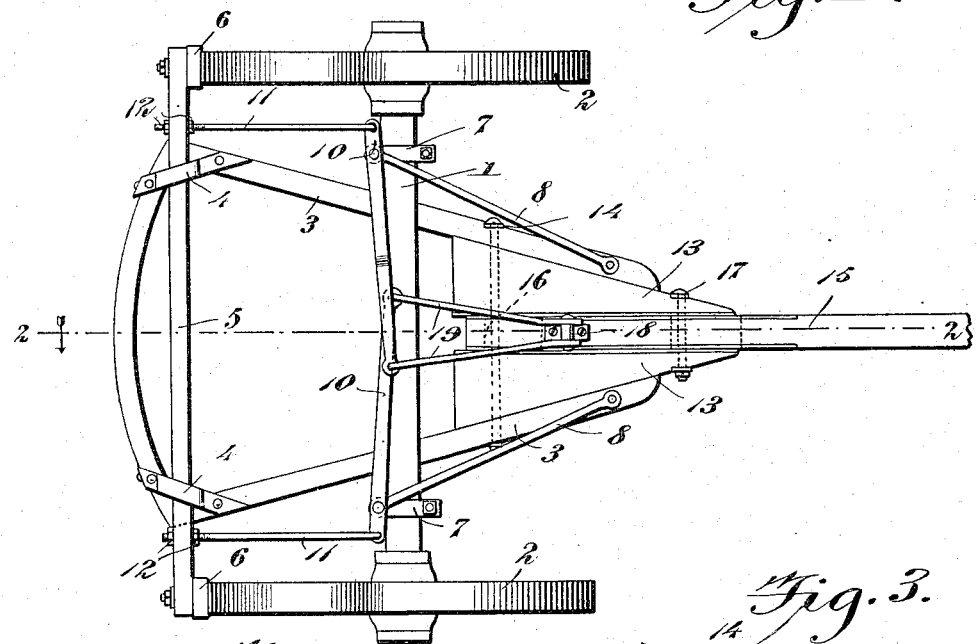
Figure 4:
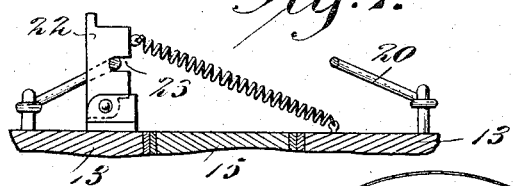
Figure 3:
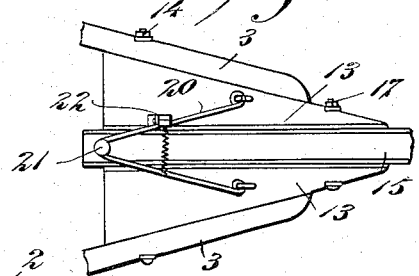
Figure 2:
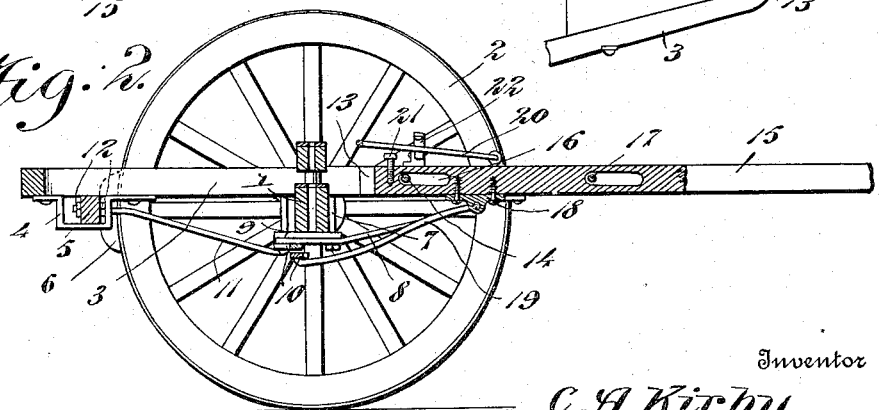

In the accompanying drawing—Figure 1 is an under plan view of the front axle and attached parts of a running gear with the brake mechanism applied. Fig. 2 is a longitudinal sectional view. Fig. 3 is a detailed plan view of parts of the brake mechanism. Fig. 4 is a detailed transverse sectional view of the upper forward part of the mechanism.

As illustrated in the accompanying drawing, the front axle and sand board 1 of a wagon running gear are supported upon wheels 2 in the usual manner. Hounds 3 extend transversely across the axle and sand-board in the usual manner. Loops 4 are connected with the rear ends of the hounds 3 and a brake beam 5 is loosely mounted in the said loops. The beam 5 carries at its ends, shoes 6 which are adapted to encounter the peripheries of the wheels 2. Clips 7 are mounted upon the axle and sand-board in the usual manner and braces 8 connect the said clips with the forward end portions of the hounds 3. The clips 7 are provided with lugs 9 upon which are fulcrumed levers 10. The inner end portions of these levers overlap each other as shown in Fig. 1 of the drawing. Rods 11 are connected with the outer end of the levers 10 and pass transversely through the beam 5 and are secured in adjusted positions with relation to the beam by means of nuts 12 which are screw threaded upon the said rods. The said nuts 12 are arranged in pairs and the members of the pairs are located at the opposite sides of the said beam.

Wedge-shaped blocks 13 are pivoted upon a bolt 14 which passes transversely through the said blocks and the forward portion of the hounds 3. A tongue 15 lies between the blocks 13 and is provided with elongated slots 16, one of which receives the bolt 14 and the other receives a bolt 17 which passes transversely through the forward portions of the blocks 13. An eye 18 is mounted upon the under side of the tongue 15 and links 19 pivotally connect the said eye with the inner ends of the levers 10. Thus it will be seen that when the tongue 15 is moved in a rearward direction between the blocks 13, the inner ends of the levers 10 are swung rearwardly by the thrust of the links 19. Thus the outer ends of the said levers 10 are carried forwardly and the beam 5 is moved in a forward direction in the loops 4 and consequently the shoes 6 are brought in contact with the peripheries of the wheels 2.

It will be seen that the blocks 13 are pivotally mounted upon the bolt 14 and consequently the said blocks 13 may swing vertically between the forward end portions of the hounds 3 at the same time the said blocks are restrained against longitudinal movement with relation to the said hounds.

When the tongue 15 is moved in a forward direction between the blocks 13, the parts connecting the said tongue 15 with the beam 5 operate in a manner exactly the reverse from that above described, whereby the brake shoes 6 are carried away from the peripheries of the wheels 2. Therefore, when a backing strain is applied to the tongue 15, the brake shoes are automatically applied but when a pulling strain is applied to the said tongue, the brake shoes are in a similar manner disconnected or spaced from the peripheries of the wheels 2. Inasmuch as a great portion of the strain is transmitted to the clips 7 when the brake shoes 6 are applied to the peripheries of the wheels 2, the braces 8 are provided which will absorb a great portion of this strain or distribute the same, whereby the major portion of the said strain is transmitted to the forward end portions of the hounds 3 and from the said hounds to the axle and sandboard.

In connection with a device as above described, it is sometimes desirable to fix the tongue with relation to the blocks in order that the running gear may be freely backed or pulled ahead as desired. Such a device is provided in conjunction with the present structure and it consists of a bail 20 which is pivotally connected with the blocks 13 and which is adapted to swing down over the upper end portion of a pin 21 carried by the tongue 15. The intermediate portion of the bail 20 may pass over the said pin when the tongue 15 is pulled in a forward direction and consequently the brake shoes are out of engagement with the peripheries of the wheels 2. A spring actuated catch 22 is pivotally mounted adjacent the bail 20 on one of the blocks 13 and is provided with a notch 23 which is adapted to engage the intermediate portion of the bail 20 whereby the said bail is held out of engagement with the pin 21. Therefore it will be seen that a brake mechanism is provided which is automatic in its action and means are provided in connection with said brake mechanism for securing the parts thereof against relative movement in order that the running gear of a wagon may be freely moved in a backward direction when desired.

Having described the invention what is claimed is:

In combination with a wheel mounted axle having hounds, a brake mechanism comprising a beam carrying shoes adapted to encounter the peripheries of the wheels, levers fulcrumed upon the axle, means operatively connecting the levers with the beam, blocks pivotally mounted between the hounds, a tongue movably mounted between the blocks, a bail approximately V-shaped in plan pivoted at its ends upon the blocks beyond the opposite sides of the tongue, a pin mounted upon the tongue and adapted to be engaged by the bail at the intermediate pointed portion thereof, a catch pivoted upon one of the blocks for the movement transversely of the bail and having a notch adapted to receive part of the bail and hold the bail out of engagement with the pin and a spring connected with the catch and the other block and holding the catch in engagement with the bail.

In testimony whereof I affix my signature in presence of two witnesses.

CHARLES A. KIRBY.

Witnesses:
 ORLOW BECKWITH,
 JEFFERSON OSBORN.

Copies of this patent may be obtained for five cents each, by addressing the "Commissioner of Patents, Washington, D. C."